United States Patent [19]
Degginger et al.

[11] 3,752,234
[45] Aug. 14, 1973

[54] FIRE FIGHTING SYSTEM

[75] Inventors: Edward R. Degginger; Thomas R. Steadman, both of Convent Station, N.J.

[73] Assignee: Allied Chemical Corporation, New York, N.Y.

[22] Filed: Aug. 19, 1971

[21] Appl. No.: 173,269

Related U.S. Application Data

[63] Continuation-in-part of Ser. No. 081,517, Oct. 16, 1970, abandoned.

[52] U.S. Cl............... 169/1 A, 252/3, 252/8.1, 252/139, 252/363.5, 117/3, 117/104 B, 117/105.5, 117/137, 260/29.6 BM, 260/29.6 E, 161/403
[51] Int. Cl........................... A62c 1/12, A62c 3/02
[58] Field of Search................ 252/2, 3, 8.1, 139, 252/363.5; 117/3, 104 B, 105.5, 137; 260/29.6 E, 25.6 BM; 161/403; 169/1 A

[56] References Cited
UNITED STATES PATENTS

| | | | |
|---|---|---|---|
| 3,632,786 | 1/1972 | Nickerson.................. | 260/29.6 BM |
| 3,537,873 | 11/1970 | Degginger.................. | 117/3 |
| 2,657,137 | 10/1953 | Kessels...................... | 252/363.5 X |
| 3,661,776 | 5/1972 | Fletcher et al............. | 252/3 |
| 3,655,555 | 4/1972 | Rossmy et al.............. | 252/3 |
| 2,354,979 | 8/1944 | Almy.......................... | 260/24.6 BM |
| 2,679,489 | 5/1954 | Cunningham............... | 260/29.6 BM |
| 1,264,104 | 4/1918 | McComb et al............. | 252/139 |

Primary Examiner—Roland E. Martin, Jr.
Attorney—Arthur J. Plantamura et al.

[57] ABSTRACT

Aqueous dilatant solutions containing alkali metal borate, polyvinyl alcohol (PVA) and a fluorocarbon foaming agent are effective supressants for burning lighter than water organic liquids. The solubility of borate in water is enhanced by the use of a $C_2$ to $C_{12}$ polyol. These dilatant solutions are most advantageously formed by combining streams of aqueous borate solution and aqueous PVA solution.

8 Claims, No Drawings

FIRE FIGHTING SYSTEM

This application is a continuation-in-part of copending application Ser. No. 081,517, filed Oct. 16, 1970, now abandoned.

BACKGROUND OF THE INVENTION

Forest, brush, and grass-range fires cause enormous damage each year. For example, in the decade 1948–1957, over 100 million acres of forest land were destroyed by fire. Not only is valuable timber destroyed, but frequently houses, business structures and lives are also lost. The threat of such fires is ever present in many areas of the country, particularly during the drier months of the year. Such fires will hereinafter be referred to as forest fires, although it will be understood that the burning vegetation may comprise trees, leaves, or other dead vegetation, shrubs, bushes, grass, farm crops, or any combination thereof. Likewise, buildings having a substantial amount of surrounding vegetation frequently are largely composed of combustible matter and are thereby destroyed when such surrounding vegetation catches fire.

The important common denominator of all such outdoor vegetation fires is that once ignited, the fire spreads from its source through adjacent vegetation and any other combustible matter until it is extinguished or burns up all such surrounding combustible matter. Such fires ordinarily spread by successive ignition of unburned vegetation adjacent to the burning area. This vegetation is brought to ignition temperature by heat radiated and convected from the flame front.

Generally, vegetation must be very close to or even enveloped by flame or superheated by gases in a convection column before igniting. This mechanism results in a more or less continuous advancement of such a fire. Fire spread may also be caused by spotting, that is, ignition by burning brands carried outside the fire area by wind and turbulence. Nearby buildings are very frequently ignited by burning brands falling on the roofs thereof.

One of the most common methods of controlling and suppressing a forest fire is by creating a fuel-less barrier. This may be done, for example, by digging a trench through surface vegetation down to mineral soil ahead of an approaching fire of sufficient width to prevent the fire from crossing. However, this may require a trench of considerable width, i.e., approximately the square of the height of the flames. In some instances, it is desirable to burn off an area containing noxious vegetation, e.g., poison ivy, while at the same time insuring that the fire does not spread to the surrounding vegetation. Under these circumstances, digging of a trench may not be practicable.

Since the early 1950's, use has been made of chemicals to prepare a nonflammable fire-line either in preventing the spread of forest fires or in burn-off operations. An aqueous slurry or solution is sprayed in a line upon surface vegetation to provide a noncombustible line in the same manner as a trench. More commonly, in the case of forest fires, the aqueous slurry is dropped or sprayed in bulk from a low-flying airplane in a line just ahead of the advancing flame front. The fire, on reaching the slurry-coated or solution sprayed vegetation, either stops completely or is sufficiently reduced in intensity to enable ground crews to work safely and effectively with conventional firefighting equipment; for example, water hoses.

Water alone, although exceedingly effective for a brief period at rendering vegetation noncombustible, is not really usable as a fire retardant since it is rapidly lost after application to the vegetation by evaporation and run-off. Desirably, the retardant will adhere to the vegetation to which it is applied and be comparatively nonvolatile and resistant to absorption into the soil. These characteristics collectively determine the effectiveness of the retardant.

Other characteristics desirable in a fire retardant include ease of aerial application and from tank trucks, low metal corrositivity and abrasivity, minimal toxicity, low cost, ease of mixing and pumping, and good storage stability. Currently used fire retardants, which generally comprise water as a major constituent, plus one or more thickening agents, have deficiencies in one or more of the above-indicated characteristics. For example, many fire-retardant formulations contain pectin or algin, both of which deteriorate in storage. Other retardant formulations contain high concentrations of sodium calcium borate, which is toxic to vegetation. Particularly desirable in a fire retardant is the ability to render vegetation fire resistant for a more or less prolonged period of time. This requires in general not only that the retardant have good adherence to the vegetation, but also that the retardant be resistant to wash-off by rain and evaporative water loss.

U.S. Pat. No. 3,537,873 teaches that aqueous dilatant solutions containing from 0.5 to 5.0 weight percent water-soluble vinyl alcohol polymer and from 0.5 to 5.0 weight percent alkali metal borate possess many desirable properties from the standpoint of fire-retardant applications, e.g., they are sticky and adhere readily to smooth or irregular surfaces. After application, such solutions form a comparatively impermeable surface skin that results in significantly reduced loss of the water constituent of the solution by evaporation or drain off.

This patent teaches that the application of such aqueous dilatant solutions to outdoor vegetation renders such vegetation noncombustible or at least significantly reduces its combustibility. Said patent discloses and claims the application of the above-described aqueous solutions to living or dead vegetation to reduce the combustibility of said vegetation. Such aqueous solutions are indicated to be particularly advantageously applied to vegetation at or immediately ahead of a flame front.

In the aforesaid U.S. Pat. No. 3,537,873, the preparation of an aqueous borate/polyvinyl alcohol dilatant solution either by separately adding borate and polyvinyl alcohol (PVA) to an agitated and preferably heated aqueous menstruum, or by combining separate aqueous PVA and aqueous borate solutions was described. However, in both cases, an aqueous PVA/borate solution was first prepared and then subsequently applied to the combustible substrate. Since the aqueous PVA/borate solutions possessed the property of dilatancy, i.e., an increase in viscosity when subjected to shear, handling of the solution and in particular, pumping it prior to spraying or otherwise applying it to the combustible substrate, posed mechanical problems.

Additionally, the invention described in said patent does not provide a complete solution to the problem of fighting fires. It does not address itself, for example, to the problem of extinguishing or suppressing already started fires in urban areas, i.e., fires in which burning buildings or quantities of merchandise, e.g., lumber, furniture, cloth, or dried foodstuffs, or a combination thereof, are the combustible matter.

As described in copending, commonly assigned application Ser. No. 059,778, filed July 23, 1970, now U.S. Pat. No. 3,676,169 and entitled "Fire Fighting System," it has been found that dilatant solutions can also be advantageously applied as fire retardants or suppressants to buildings, furniture, stored lumber, and other nonvegetation combustibles.

In addition to the teaching that such aqueous dilatant solutions can advantageously be applied to most types of combustibles, said copending application also discloses a vastly superior procedure for applying aqueous borate/polyvinyl alcohol solutions to combustible substrates for fire retardation or fire suppressant purposes by the in situ formation of the dilatant solution from converging streams of aqueous borate solution and aqueous PVA solution.

However, it should be noted that the dilatant solutions heretofore disclosed are generally unsuitable for extinguishing burning lighter than water organic liquids such as gasoline, jet fuel, crude oil and the like. The reason is, of course, that the dilatant solution is more dense than the burning organic liquid which therefore floats on top of any applied dilatant solution and hence is not smothered.

Additionally, it has subsequently been found that dilatant solutions can be prepared which are effective fire fighting agents utilizing both greater and lesser amounts of borate and vinyl alcohol polymer than was disclosed in said patent or said copending application.

Finally, it must also be noted that aqueous borate solutions, particularly where higher concentrations of borate, especially borax, are being used, are sometimes difficult to prepare in that the borate is difficultly soluble in water at ambient temperature. That is, the solubility of borax, for example, in water at 25°C. is about 3.0 weight percent.

Although the terms "fire retardant" and "fire suppressant" have no clearly defined meaning and are frequently used interchangeably, as used in the instant application, the term "fire retardant" means a substance which renders flammable, but nonignited substrates either noncombustible or less combustible. A "fire suppressant" is a substance which serves to extinguish already burning or glowing flammable substrates as by reducing or eliminating the combustibility of the unburned portions of such substrates.

SUMMARY OF THE INVENTION

It is an object of this invention to provide a superior process for fire retardation and fire suppression. It is a further object of this invention to provide an improved technique for applying substantial quantities of water to a combustible substrate in such a form that said water will be resistant to run-off and evaporative loss.

More specifically, it is an objective of this invention to provide an aqueous borate containing dilatant solution wherein the borate is readily soluble at ambient temperature at higher concentrations than are achievable by conventional means.

It is a further specific objective of this invention to provide aqueous dilatant solutions which are effective fire suppressants for lighter than water organic liquid fires.

Further objects and advantages will become apparent from the description of the invention which follows in greater detail.

As reported in said application Ser. No. 059,778, now U.S. Pat. No. 3,676,169, it has been found that if separate aqueous solutions of alkali metal borate and PVA, respectively, are brought together in the form of converging streams of the respective solutions, a viscous dilatant solution is instantly formed which solution possesses excellent fire retardant and fire suppressant properties. This poses the great advantage that the separate aqueous solutions of alkali metal borate and PVA which are easily handled by conventional pumping equipment can be separately stored until needed, ordinarily in tanks or similar containers, although for certain large scale operations, other type containers such as ponds can also be utilized.

When it is desired to utilize the dilatant composition for treating flammable substrates to render the same noncombustible or to extinguish already burning substrates, converging streams of the two solutions are sprayed at the substrate. The two streams, on converging, essentially instantly form the viscous dilatant solution having the aforementioned fire suppressant and fire retardant properties. The convergence of the two streams can be effected either within the dispensing nozzle or at any point from the point at which the two streams exit from the dispensing apparatus up to the point at which the streams impinge on the substrate since, as above indicated, the dilatant solution forms almost instantaneously. Preferably, the streams will be converged to form the dilatant solution either immediately before or as soon as possible after leaving the dispensing apparatus. This latter is most readily achieved by utilizing two immediately adjacent nozzles which are so shaped and positioned that the streams issuing from the respective nozzles converge essentially instantly after such emergence. Alternatively, the two nozzles can be arranged in concentric fashion with an outer nozzle essentially coaxially concentrically disposed around an inner nozzle with the exit apertures of both nozzles likewise being essentially concentric and coterminous. The exact fashion in which convergence of the streams is achieved is not critical since it is only necessary that convergence take place at some point before or even on the combustible substrate, as heretofore indicated. Convergence immediately prior to exiting from the dispensing apparatus is achieved by equipping the dispensing apparatus with a single nozzle wherein separate conduits for the borate and PVA converge within the nozzle and then immediately exit therefrom in a single stream of dilatant fluid. The advantage of utilizing a dilatant solution which is formed only immediately prior to its application to the substrate being treated is that the dilatant solution is not handled by mechanical equipment, that is, the convergence of the two streams is exterior to or immediately prior to exiting from the dispensing mechanism. That is, no actual transfer through tubing (other than the dispensing nozzle in some instances) of a dilatant fluid is ever necessary.

Most suitably, the converging streams will be ejected by air pressure so that they will be in the form of comparatively small droplets interspersed with air. When such streams in the form of droplets converge, the resulting dilatant solution is in the form of a thick foam which is a particularly desirable form for purposes of the instant invention especially when treating burning organic liquid fires.

The pumping or other solution transfer equipment utilized to spray the converging streams is a matter of choice and any of the conventional equipment which is currently available for spraying essentially noncorrosive, aqueous solutions of wide viscosity range can be utilized.

The dilatant solutions of the instant invention contain from about 0.1 to 10.0 weight percent each of alkali metal borate and PVA. Since such dilatant solution is obtained by the combination of two separate solutions as flowing streams, possibly at differing flow rates, the operable concentration of PVA and borate in the respective separate solutions prior to combination cannot be given with exactitude. Assuming equal volumes of the two solutions are being combined, the concentrations of the PVA and borate in the respective separate solutions could vary from 0.2 to 20.0 weight percent, which on combination would provide the final desired concentration of 0.1 to 10.0 weight percent of each. It is, of course, not necessary that the concentration of PVA and borate in the combined stream be identical since dilatant solutions are obtained as long as both components are each present in the combined stream in a concentration ranging from 0.1 to 10.0 weight percent. It should be noted that it is extremely difficult to dissolve greater than about 15 weight percent of PVA in water even by heating unless a low molecular weight fully saponified PVA is utilized. It is therefore preferred that the maximum concentration of the PVA containing aqueous solution which is combined with the aqueous borate solution to form the dilatant solution shall not be greater than about 10.0 weight percent. The preferred concentration of alkali metal borate and vinyl alcohol polymer in the fire retardant dilatant solutions of this invention will range from about 0.4 to 4.0 by weight of each.

The separate solutions of PVA and borate are readily prepared by simply dissolving PVA and borate respectively in the correct amount of water to provide the desired concentration. Dissolution is facilitated if the addition is accompanied by agitation and heating of the water.

Unfortunately, it is not possible to dissolve more than about 3.0 weight percent of borax in water at ambient temperature. Other borates likewise have a fairly low solubility in water at about 25°C. The solubility of course increases with increasing temperature.

To increase the solubility of the borate in cold water, we have found it advantageous to add to the water prior to or simultaneously with the borate from 0.5 to 10 weight percent, based on the weight of the water present in the dilatant solution as ultimately constituted, of a $C_2$ to $C_{12}$ water soluble polyhydric alcohol.

In the case where the borate and PVA are dissolved in separate solutions which are thereafter combined, the concentration of polyhydric alcohol, even as borate, will of course, be greater in the borate containing solution prior to combination with the PVA containing solution to form the dilatant solution. The concentration of polyhydroxy alcohol in the borate solution should be such as to afford a concentration of polyol in the dilatant solution ranging from 0.5 to 10.0 weight percent, preferably 1.0 to 5.0 weight percent.

The term "water-soluble polyhydric alcohol" as used in the instant application connotes a $C_2$ to $C_{12}$ polyhydroxy nonaromatic hydrocarbon, i.e., alkane, alkene, cycloalkane, or cylcoalkene, having from 2 to 8 hydroxyl groups. The term "water-soluble," as applied to such polyols, connotes that the polyol is soluble in water to the extent of at least 25 weight percent at 25°C.

Examples of suitable water-soluble $C_2$ to $C_{12}$ polyhydroxy nonaromatic hydrocarbons include, for example, ethylene glycol, diethylene glycol, triethylene glycol, trimethylene mono- and mono-and dipropylene glycol, glycerol, erythritol, pentaerythritol, trimethylol ethane and trimethylol propane, arabitol, adonitol, xylitol, mannitol, sorbitol, iditol, dulcitol, mono- and disaccarides such as glucose, dextrose, fructose, sucrose, Enzose*, (*Enzose is a trademark of the Corn Industrial Company connoting a crude glucose.) and the like, and the various isomeric cyclohexane triols and n-hexane triols. Most preferred are glucose, Enzose, dextrose, and sucrose.

The term alkali metal borate, as used in the instant specification and in the appended claims, embraces not only the alkali metal salts of the common boric acids, i.e., tetraboric acid, $H_2B_4O_7$ and meta-boric acid, $HBO_2$, but also the other boric acids such as $H_2B_2O_4$, $H_2B_6O_{10}$, $H_2B_{12}O_{19}$, $H_6B_4O_9$ and $H_6B_8O_{15}$ which form alkali metal salts. Hydrates of any of the borate salts are also suitable.

Either a single borate salt or any mixture thereof can be used. Ordinarily, no advantage accrues from the use of a mixture of borates. Likewise, although alkali metals other than sodium and potassium are perfectly usable, they are not preferred for economic reasons.

The preferred borate is borax, i.e., sodium tetraborate decahydrate.

The term water-soluble vinyl alcohol polymer as used herein and in the appended claims embraces vinyl alcohol polymers having up to 50 percent of the hydroxyl groups thereof replaced by methoxy, ethoxy, acetyl, propionyl, or butyryl radicals, i.e., partially etherified or esterified polyvinyl alcohol. Said methoxy and ethoxy ether radicals can be unsubstituted or substituted with hydroxyl or carboxyl groups. Said acetyl, propionyl and butyryl radicals can likewise be unsubstituted or can be halogen- or hydroxyl-substituted. Preferably, no more than about 20 percent of the *Enzose is a trademark of the Corn Industrial Company connoting a crude glucose. polyvinyl alcohol hydroxyl groups will be replaced by any of the aforementioned ether or ester radicals. The term "water-soluble" means that the polymer is soluble to the extent of at least 5.0 weight percent in water at room temperature, although heating the water to a higher temperature of up to about 95°C. may be necessary in some instances to initially dissolve the polymer.

The vinyl alcohol polymers utilized in the practice of the instant invention can, therefore, be represented by the structural formula:

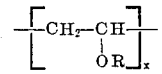

wherein x can range from about 1,200 to about 5,000, preferably 1,600 to 3,000, and wherein R represents hydrogen-, methyl-, ethyl-, acetyl-, propionyl-, butyryl-, hydroxyl-, or carboxyl-substituted methyl or ethyl, or halogen- or hydroxyl-substituted acetyl, propionyl or butyryl, and wherein at least 50 percent of said R groups are hydrogen. The water-soluble vinyl alcohol polymers of the instant invention can have molecular weights ranging from about 50,000 to about 450,000 and preferably from about 70,000 to 200,000. The most preferred PVA is 98–100 percent saponified with a molecular weight of 70,000 to 120,000. (X = about 1,600 to 2,700).

Vinyl alcohol polymers are conventionally obtained by polymerizing esters of vinyl alcohol followed by saponification of the ester groups. To prepare the polymers of the instant invention, wherein up to about 50 percent of the R groups are acyl, one polymerizes the corresponding vinyl ester to afford the polyvinyl ester having all R groups acyl and then partially or fully saponify said polyvinyl ester and thereby remove 50 percent or more of the acyl groups. For example, to prepare polyvinyl alcohol containing 20 percent acetyl groups, polyvinyl acetate would be 80 percent saponified and the remaining 20 percent acetyl groups left unsaponified. To prepare the methoxy and ethoxy ether derivatives of polyvinyl alcohol, an essentially fully saponified material, i.e., polyvinyl alcohol having 98+ percent hydroxy groups, as would be obtained by essentially total saponification of a polyvinyl ester, is etherified up to the desired degree, that is, up to about a maximum of 50 percent of the hydroxyl groups can be etherified using conventional etherification agents such as diazomethane, dimethyl sulfate or diethyl sulfate.

Particularly superior fire retardant and fire suppressant formulations are obtained when the dilatant solution contains as an additional component 0.1 to 10 weight percent of a fluorocarbon foaming agent. Such foaming agent enables the dilatant solution to be used effectively against liquid hydrocarbon and similar combustible organic liquid fires which are ordinarily not amenable to extinguishment by water because the burning organic liquid will float on the water sprayed on it. The aqueous foams obtained when using a fluorocarbon foaming agent will, in contradistinction, coat the hydrocarbon surface and extinguish or prevent ignition or reignition thereof. These fluorocarbon foaming agents are also widely referred to as "light water" agents because the aqueous foam formed by them will float on the ordinarily less dense hydrocarbon.

While a wide variety of fluorocarbon compounds will function as light water agents, they all have certain characteristics in common. In general, such fluorocarbon compounds provide long-chain, surface active cations or anions which have a terminal perfluoroalkyl chain that is both hydrophobic and oleophobic and therefore repellant to water and to hydrocarbons. The molecules are capable of concentrating on the surface of water or hydrocarbon fuel and form an oriented surface film with the perfluorocarbon end pointed upward.

Suitable fluorocarbon compounds are described in U. S. Pat. Nos. 3,258,423 and 3,257,407 and in co-pending, commonly assigned applications Ser. No. 823,520, filed May 9, 1969 and 885,328, filed Dec. 15, 1969. Examples of the compounds disclosed therein include the following: perfluorocarboxylic and perfluorosulfonic acids, represented by the general formula $R_fCO_2H$ and $R_fSO_3H$, respectively. In the carboxylic acid molecule, the $R_f$ is a perfluoroalkyl chain of seven carbon atoms, $C_7F_{15}$—, and in the sulfonic acid molecule, the $R_f$ is a perfluoroalkyl chain of eight carbon atoms, $C_8F_{17}$—. The perfluoroalkyl $R_f$ may be a straight chain or a branched chain. Preferred fluorocarbons which are useful for the purposes of the present invention comprise the following quarternary nitrogen compounds which have in their molecular structure an intermediate amidopolymethylene linkage:

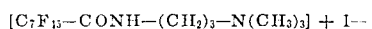
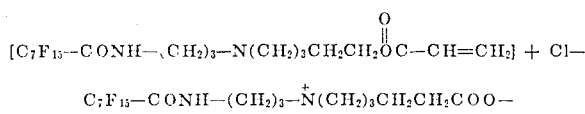

An additional fluorocarbon which is also suitable for the preparation of the present foam is the sulfonamido aliphatic acid salt represented by the formula:

$$C_8F_{17}SO_2N(C_2H_5)CH_2COOK$$

Compounds of the structure:

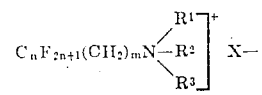

wherein n is from 3 to about 20, m is from 3 to about 30 and wherein

represents a radical derived from a member selected from the group consisting of ammonia; pyridine; quinoline; picoline; and primary phenyl amine; and X is selected from the group consisting of a halide ion, a sulfate anion, a phosphate anion, an arylsulfonate anion and an alkylsulfonate anion are suitable. Also suitable are quaternary ammonium compounds of the formula:

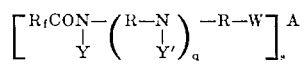

wherein $R_f$ is a polyfluoroisoalkoxyalkyl radical of the formula

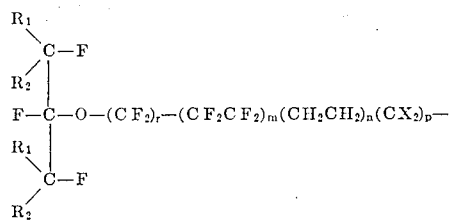

wherein $R_1$ and $R_2$ independently at each occurrence are fluorine, chlorine, perfluoroalkyl or together can form a cyclic perfluoroalkylene group with the proviso that both $R_1$ and $R_2$ cannot be chlorine; m and n are integers from 0–20; the sum of m and n is 0–20; r is an integer from 0–1 and is 0 when the sum of m, n, and p is greater than 0 and is always 1 when the sum of m, n, and p is 0; p is an integer from 0–1; X is hydrogen or fluorine with the proviso that when n is 1 or more, X must be hydrogen; Y is hydrogen or alkyl of 1-6 carbon atoms; q is an integer from 0-2; R independently at each occurrence is an alkylene group of 1-6 carbon atoms; Y' independently at each occurrence is hydrogen, alkyl or hydroxyalkyl of 1-6 carbon atoms, acyl of the formula

wherein $R_f$ has the aforesaid meaning, or

wherein R and Y have the aforesaid meanings and Z is hydrogen, alkyl of 1-6 carbon atoms, or acyl of the formula

wherein R has the aforesaid said meaning; W is a quaternary ammonium radical, A is an accompanying anion and s is an integer from 1 to 3 and is equal to the negative charge of A, and compounds of the formula:

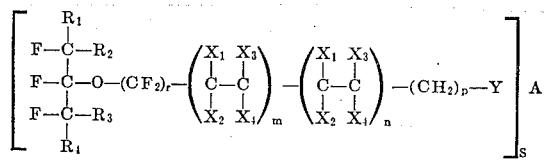

wherein
a. $R_1-R_4$ are independently selected from the group consisting of fluorine, chlorine and perhaloalkyl groups of one to 10 carbon atoms, or when taken together $R_1-R_4$ form a perhalocycloalkyl structure, the halo portions of $R_1-R_4$ being fluorine or chlorine, with the provisos that each carbon atom of $R_1-R_4$ contain at least one fluorine atom, no more than three of $R_1-R_4$ are haloalkyl groups, $R_1$ and $R_2$ cannot both be chlorine and $R_3$ and $R_4$ cannot both be chlorine;

b. $X_1-X_4$ independently are hydrogen, fluorine, chlorine or bromine, provided that each $X_1-X_4$ group does not include more than two chlorine atoms or one bromine atom, and when $X_1$ and $X_3$ independently are each hydrogen or fluorine, each of $X_2$ and $X_4$ independently can be $CF_2R_5$ wherein $R_5$ is a radical selected from the group consisting of fluorine, chlorine, alkyl of one to eight carbon atoms, or haloalkyl of one to eight carbon atoms in which the halogen atoms are fluorine, chloroine or bromine, and the $(X_1X_2C-CX_3X_4)_m$ and $(X_1X_2C-CX_3X_4)_n$ moieties may be the same or different;

c. Y is a nitrogen-containing radical selected from the group consisting of thiourea and alkyl or hydroxyalkyl substituted thiourea connected through their S atom to the terminal C atom of the polyfluoroisoalkoxyalkyl radical, and pyridine, pyridine, quinoline, alkyl or hydroxyalkyl substituted pyridine and alkyl or hydroxyalkyl substituted quinoline, connected through their N atoms to the terminal C atom of the polyfluoroisoalkoxyalkyl radical, said alkyl and hydroxyalkyl substituents containing from one to three carbon atoms;

d. A is an accompanying anionic moiety;
e. r is an integer from 1-2, m and n are integers from 0-20, the sum of m and n is 0-20, with the proviso that when p is 0, n must be at least 1 and $X_3$ and $X_4$ in the $(X_1X_2C-CX_3X_4)_n$ moiety must be hydrogen and s is an integer from one up to the total negative charge of A.

Other suitable compounds are described in copending applications Ser. No. 749,302 filed Aug. 1, 1968, U.S. Pat. No. 3,600,415, and Ser. No. 53,705 filed July 9, 1970.

Exemplary compounds include:
Amidoamine oxides of the formula

wherein $R_f$ is a perfluoroalkyl radical of four to 25 carbon atoms or a polyfluoroisoalkoxyalkyl radical of the formula

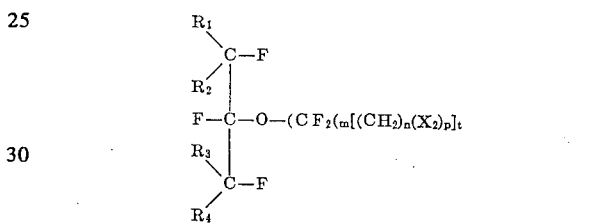

wherein $R_1$, $R_2$, $R_3$ and $R_4$ independently at each occurrence are fluorine, chlorine, perfluoroalkyl of one to nine carbon atoms or wherein one of $R_1$ and $R_2$ and one of $R_3$ and $R_4$ taken together form a cyclic perfluoroalkylene group with the proviso that no more than two of the four $R_1-R_4$ groups are chlorine atoms and provided further that no more than two of the four $R_1-R_4$ groups are perfluoroalkyl groups; m is an integer 1 to 40; n, p, and t are each integers of 0 to 20, the sum of m and t (n + p) being 2 to 41, with the proviso that when n is odd, p is odd, and when n is even, p is even; X is hydrogen or fluorine;
R is a straight- or branched-chain alkylene radical of the formula

wherein z is an integer of 1 to 6; or a covalent bond between the amide nitrogen and a carbon atom in Q; Y is hydrogen or alkyl of one to six carbon atoms when R is an alkylene radical, and
Q is (A) an aliphatic amine oxide radical of the formula:

wherein $R_5$ and $R_6$ are each alkyl radicals of one to six carbon atoms or hydroxy-terminated alkyl radicals of two to six carbon atoms, or B. a cycloaliphatic amine oxide radical of the formula:

wherein Z is a divalent radical of the formula:

$$-(CH_2)_4-,$$
$$-(CH_2)_5-, \text{ or}$$
$$-(CH_2)_2-O-(CH_2)_2-, \text{ or C. an aromatic}$$

heterocyclic amine oxide radical selected from pyridyl-N-oxide radicals and quinolyl-N-oxide radicals; with the proviso that when Q is the said aliphatic amine oxide radical or the said cycloaliphatic amine oxide radical, R is always the said alkylene radical, and compounds having the formula

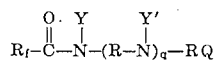

wherein
a. $R_f$ is a radical having the formula

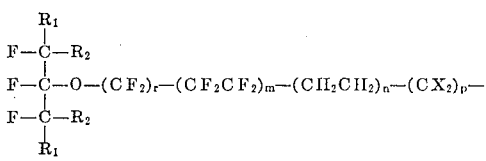

wherein
i. $R_1$ and $R_2$ are fluorine or fluoroalkyl groups, or, taken together are fluoroalkylene groups forming a cycloaliphatic structure, which $R_1$ and $R_2$ groups may each have from one to nine carbon atoms, provided that not more than three of the $R_1$ and $R_2$ groups may be fluoroalkyl groups,
ii. $m$ and $n$ are each integers of from 0 to 10, with the proviso that the sum of $m$ and $n$ is from 0 to 20, and provided further that when $r$ is 0, $m$ is at least 1,
iii. X is selected from the group consisting of hydrogen and fluorine, with the proviso that when $n$ is greater than 0, then X is always hydrogen,
iv. $p$ is 0 or 1,
v. $r$ is 0 or 1, with the proviso that when the sum of $m$, $n$, and $p$ is greater than 0, then $r$ is always 0,
b. Y is selected from the group consisting of hydrogen and alkyl having from one to six carbon atoms,
c. R, which can be the same or different, is a divalent straight-chain or branched-chain alkylene bridging group containing from one to six carbon atoms,
d. $q$ is an integer from 0 to 2,
e. Q is a member selected from the group consisting of
 i. the pyridyl radical,
 ii. alkyl-substituted pyridyl radicals wherein the alkyl substituent or substituents contain from one to two carbon atoms, and
 iii. a radical having the formula

wherein $R^a$ and $R^b$ are independently selected from the group consisting of alkyl having from one to six carbon atoms and a radical having the formula —ROH wherein R has the aforestated meaning,
f. Y', which can be the same or different in different

groups is a member selected from the group consisting of
 i. hydrogen,
 ii. alkyl having from one to six carbon atoms,
 iii. a radical having the formula —ROH wherein R has the aforestated meaning,
 iv. an acyl radical having the formula

wherein $R_4$ has the aforestated meaning.
 v. a radical having the formula -RNYZ wherein R and Y have the aforestated meanings and Z is a member selected from the group consisting of hydrogen, alkyl having from one to six carbon atoms, and an acyl radical having the formula

wherein $R_f$ has the aforestated meaning,
wherein $R^a$ and $R^b$, and $R^a$ and Y' when taken together, can be alkylene groups forming a cycloaliphatic structure.

The fluorocarbon foaming agent can suitably be present in either the PVA or in the borate solution or in both. As above indicated, the critical common denominator of these fluorocarbon foaming agents is that they are both oleophobic and hydrophobic. It is these characteristics that enable them to function as foaming agents. The use of the fluorocarbon foaming agents is compatible with the use of the polyhydric alcohol to increase the borate solubility.

The pumping or other solution transfer equipment utilized to spray the converging streams is a matter of choice and any of the conventional equipment which is currently available for spraying essentially noncorrosive, aqueous solutions of wide viscosity range can be utilized.

As heretofore indicated, the respective streams of border and PVA can converge either without the nozzle of the dispensing apparatus or within it immediately prior to ejection. If convergence within the nozzle is contemplated, no difficulty is encountered provided sufficiently powerful pumping equipment is utilized to provide the necessary impetus to eject the already formed dilatant solution from the nozzle. The problems encountered in pumping or otherwise transferring quiescent, already formed dilatant solutions are therefore not encountered.

The rate of application of the dilatant solutions of the instant invention will obviously vary with the substrate being treated. Ordinarily, from about ½ to 50 gallons per 100 square feet of substrate is a suitable application rate although higher or lower application rates can be used if desired. Where the substrate is vegetation, obviously, the thicker the vegetation, the greater the amount of solution which must be applied to reduce the combustibility of said vegetation. In the treatment of burning organic liquids, the preferred rate of application will vary from about 10 to about 50 gallons per 100 square feet of organic liquid surface so as to provide a coating of dilatant solution over the entire liquid surface.

A particular advantage which accrues from treating combustible substrates with the dilatant compositions of the invention is that if some portions of the substrate surface are missed, heat caused by nearby fire will reduce the viscosity of the adhering dilatant solution and frequently cause it to flow on to adjacent hitherto untreated portions of the substrate.

The invention can be more fully understood by reference to the following examples. All parts are by weight unless otherwise expressly noted.

EXAMPLE 1

175 Grams of 98+ percent saponified polyvinyl alcohol (molecular weight about 100,000) was added with stirring to 4,200 cc of water heated to 85°C. forming a homogeneous solution. 175 Grams of borax was dissolved by adding with stirring to 4,200 cc of water at about 85°C. The borax and polyvinyl alcohol solutions were both cooled to about 40°C. and then separately charged to two 2½ gallon fire extinguishers which were then pressurized with nitrogen to 120 psi. The outlet nozzles of the two fire extinguishers were fitted together so that when the PVA and borax solutions emerged from the respective nozzles, the two solutions merged to form a single unitary, substantially homogeneous stream. Rates of flow were adjusted by valves to that equal rates of delivery were obtained.

A flat, rectangular area of bare ground 10' × 20' was covered with a 6-inch deep layer of dead and dried vegetation consisting of leaves, twigs, and branches up to 1 inch in diameter. A 2-foot wide band of this vegetation running between approximately the mid-points of the two opposite long sides of the rectangle, i.e., a 20-square foot area of vegetation, was uniformly sprayed by means of the fire extinguishers with about one-fourth of the solution present in each tank. The merged streams emitted from each tank formed a dilatant solution almost instantaneously so that the solution actually deposited on the vegetation was a dilatant solution.

After a wait of 2 hours, an upwind corner of the vegetation was ignited. Wind velocity was approximately 5 knots. All brush contiguous to the point of ignition was eventually consumed by fire up to the treated band. The treated band did not burn nor did the untreated vegetation on the other side of the band from the fire ignite. Two hours after the ignited portion had completely burned, the treated band could still not be ignited with newspaper.

EXAMPLE 2

175 Grams of 98+ percent saponified PVA of 72,000 molecular weight was added with stirring to 4,200 cc. of water at approximately ambient temperature forming a homogeneous solution.

To a second 4,200 cc. aliquot of water was added 150 grams of glucose which dissolved rapidly with stirring at ambient temperature. To this glucose solution was added with stirring 200 grams of borax. The borax dissolved and remained dissolved at ambient temperature. The borate and polyvinyl alcohol solutions were both separately charged to two 2½ gallon fire extinguishers which were then pressurized with nitrogen to 120 psi. The outlet nozzles of the two fire extinguishers were fitted together so that when the PVA and borax solutions emerged from the respective nozzles, the two solutions merged to form a single unitary, substantially homogeneous stream. Rates of flow were adjusted by valves so that equal rates of delivery were obtained.

A flat, rectangular area of bare ground 10' × 20' was covered with a 6 inch deep layer of dead and dried vegetation consisting of leaves, twigs, and branches up to 1 inch in diameter. A 2 foot wide band of this vegetation running between approximately the mid-points of the two opposite long sides of the rectangle, i.e., a 20 square foot area of vegetation, was uniformly sprayed by means of the fire extinguishers with about one-fourth of the solution present in each tank. The merged streams emitted from each tank formed a dilatant solution almost instantaneously so that the solution actually deposited on the vegetation was a dilatant solution.

After a wait of 2 hours, an upwind f of the vegetation was ignited. Wind velocity was approximately 5 knots. All brush contiguous to the point of ignition was eventually consumed by fire up to the treated band. The treated band did not burn nor did the untreated vegetation on the other side of the band from the fire ignite. Two hours after the ignited portion had completely burned, the treated band could still not be ignited with burning newspaper.

The polyol containing dilatant solution is thus seen to be substantially identical in effectiveness to the non-polyol containing solution of Example 1.

EXAMPLE 3

A number of 3.0 weight percent 5 gallon solutions of a polyhydric alcohol in water were prepared. In each case it was possible to readily dissolve 5.0 weight percent borax in the polyhydric alcohol solution by stirring at ambient temperature (23°C.). The following polyols (polyhydric alcohols) were used: ethylene glycol, trimethylene glycol, glycerol, trimethylol propane, sorbitol, glucose, dextrose, fructose, Enzose, sucrose. These borate containing solutions were combined with aqueous solutions containing 5.0 weight percent PVA in the following manner:

A special nozzle was fabricated having two inlet tubes and a single outlet tube. All three tubes were connected to an interior mixing chamber. One inlet tube was connected to a first tank equipped with a gasoline powered fluid pump. The other inlet tube was connected in similar fashion to a second pump equipped tank. Tank I was charged with 5 gallons of 5.0 weight percent aqueous solution of 100 percent saponified PVA of 75,000 molecular weight. Tank II was charged with 5 gallons of the borate-Enzose aqueous solution described above. Approximately one half the contents of each tank were simultaneously pumped into the nozzle mixing chamber at equal rates. A dilatant solution formed essentially instantaneously within the mixing chamber and was ejected from the outlet tube. The dilatant solution was sprayed over the entire surface of a 10' × 10' vertical wall of ½ inch thick unpainted white pine boards. This solution adhered to and formed a viscous coating over the wall surface. Brush was piled at the base of the wall and ignited 20 minutes after spraying the wall surface. The brush burned completely up, but the wall did not ignite. It was noted that dilatant solution from the upper portions of the wall ran down and replenished any lost from the lower wall surface through the action of the burning brush.

Each of the other polyhydric alcohol (polyol) and borate containing aqueous solutions described above formed a dilatant solution with PVA in the same fashion which dilatant solutions were essentially equally effective at preventing ignition of a similar simulated wall surface.

EXAMPLE 4

175 Grams of 98+ percent saponofied PVA of 75,000 molecular weight was added with stirring to 4,000 cc. of water at ambient temperature, forming a homogeneous solution. To a second 4,000 cc. portion of water was added with stirring, 200 grams of borax and 200 grams of sucrose. The borax dissolved readily. To the borax solution was then added 14 grams of the compound $C_8F_{17}SO_2N(C_2H_5)CH_2COOK$ prepared according to the teaching of U.S. Pat. No. 3,258,423. The borate and polyvinyl alcohol solutions were both separately charged to two 2½ gallon fire extinguishers which were then pressurized with nitrogen to 120 psi. The outlet nozzles of the two fire extinguishers were fitted together so that when the PVA and borax solutions emerged from the respective nozzles, the two solutions merged to form a single unitary, substantially homogeneous stream of dilatant fluid. Rates of flow were adjusted by valves so that equal rates of delivery were obtained.

Into a steel tank 1 meter by 1 meter by 0.5 meters deep was placed 2 liters of gasoline which was then ignited. Approximately half of the contents of each tank were sprayed onto the burning gasoline. A viscous foam formed over the surface of the gasoline which quickly extinguished the fire. Thirty seconds later a lighted blow torch was passed about one inch above the surface of the foam. No reignition occurred. RP-1 jet fuel behaved in the same fashion. When a dilatant solution containing identical amounts of borax and PVA but not containing a fluorocarbon foaming agent is applied to the burning gasoline under the same conditions, the blaze is not extinguished.

Substitution of the following fluorinated compounds (fluorocarbon foaming agents) for $C_8F_{17}SO_2N(C_2H_5)CH_2COOK$ provided a series of dilatant solutions which were essentially equally effective at suppressing gasoline or jet fuel fires:

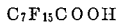

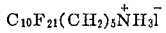

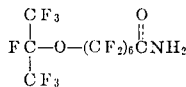

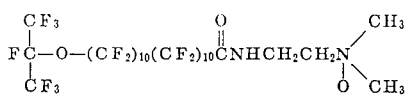

Various modifications will be apparent to one skilled in the art, and it is not intended that this invention be limited to the details in the specific examples presented by way of illustration. Accordingly, the scope of the invention is limited only by the appended claims.

1. A dilatant solution comprising
   a. from about 0.1 to 10.0 weight percent alkali metal borate
   b. from about 0.1 to 10.0 weight percent water-soluble polyvinyl alcohol
   c. from about 0.5 to 10.0 weight percent $C_2$ to $C_{12}$ water-soluble polyhydric alcohol
   d. water
   e. from about 0.1 to 10.0 weight percent of a fluorocarbon compound as a foaming agent, said compound having a long-chain, surface active cation or anion which has a terminal perfluoroalkyl chain that is both hydrophobic and oleophobic and repellent to water and to hydrocarbons.

2. A solution in accordance with claim 1 wherein said solution contains from about 0.4 to about 4.0 weight percent each of alkali metal borate and polyvinyl alcohol.

3. A solution in accordance with claim 1 wherein said alkali metal borate is borax.

4. A solution in accordance with claim 1 wherein said polyvinyl alcohol contains at least about 80 percent unsubstituted hydroxyl groups.

5. A process for extinguishing lighter than water organic liquid fires coprising applying to said fire an effective amount of the dilatant solution of claim 1.

6. A process for reducing the combustibility of a flammable substrate comprising applying to said substrate an effective amount of the solution of claim 1.

7. A process in accordance with claim 6 wherein said solution is formed from converging streams, one of said streams containing alkali metal borate and polyhydric alcohol and another of said streams containing polyvinyl alcohol.

8. A process in accordance with claim 7 wherein said convergence is achieved within a nozzle and the thereby formed dilatant solution thereafter exits from said nozzle as a single unitary stream.

* * * * *